Patented Apr. 18, 1950

2,504,542

UNITED STATES PATENT OFFICE 2,504,542

PREPARATION OF FONDANTS, FUDGES, AND THE LIKE

Herman Lebeson and Archer H. Field, Chicago, Ill., assignors to National Syrup Products Co., Chicago, Ill., a corporation of Illinois No Drawing. Application October 4, 1946, Serial No. 701,064

10 Claims. (Cl. 99—134)

Our invention relates to fondants and to fondant-type products or products which utilize fondants as a constituent thereof as, for example, cream centers for candies, fudges, grained or short caramels, grained marshmallows, and icings.

Generally speaking, a fondant comprises a product usually obtained by allowing sugar to crystallize from a super-saturated sugar solution under controlled conditions so that extremely fine crystals are formed, said crystals imparting smoothness, opaqueness and gloss to the fondant mass in a manner such as is not obtainable with extraneously added even exceedingly finely divided sugar. Conventionally, the process of preparing fondants comprises dissolving, in water, sucrose of a mixture containing sucrose and a small amount of corn syrup or other sugars and cooking the mixture to a temperature of about 240 degrees F. or slightly higher to produce a super-saturated sugar solution, the excess water used to dissolve the sugar being boiled off in the cooking operation. The batch of syrup is then cooled to about 90-110 degrees F. and is then creamed by agitation and by incorporation of air thereby into the thick mass. This procedure results in the avoidance of the formation of large, sharp sugar crystals.

Commercial fondant-type fudges are usually made by dissolving a mixture of sucrose and corn syrup in water and cooking the same to about 245 degrees F., milk is then added and the batch is again cooked to about 245 degrees F. or higher. The previously prepared fondant and the particular flavor or flavors desired are then added and, after thorough mixing, the batch is poured on a slab for cooling and graining.

In commercial operations, in view of the high temperatures which are required in the cooking operations for the production of fondants and fudges, the use of high pressure steam or other means to achieve such temperatures becomes necessary. In the case of high pressure steam equipment, high pressure boilers and steam-jacketed kettles strong enough to withstand the pressure are, obviously, required. Even with the proper equipment, variations in steam pressure have been the cause of failures to produce satisfactory batches of material. Moreover, prolonged cooking, especially of fudge, tends to destroy the desired grain structure.

In accordance with our present invention, fondants and fondant-type confection products may be made by a simple process at relatively low temperatures and without the necessity of requiring the utilization of expensive high pressure cooking equipment. Apart from the simplicity and other advantages of the process, the resulting products have exceptionally desirable characteristics. Thus, for example, fondants and fudges made in accordance with the present invention, even after a period of six months, have not dried out unduly and become too hard. Indeed, on being cut open, their interiors were found still to contain the soft and smooth texture of the product substantially as when originally made. It may also be noted that, bearing in mind that, in the commercial manufacture of fondants and fudges, the grain depends upon the amount of sucrose used in the batch, our invention makes it possible for the candy industry to avoid dependence entirely upon cane or beet sugar sources.

In the practice of our invention, we have found it especially desirable to utilize chip corn sugar, particularly the product known in the trade as #70 chip corn sugar. Such chip corn sugar contains from about 66 to about 72% dextrose and is made by the acid hydrolysis of starch. This product is also known in the trade as brewer's sugar and tanner's sugar.

In the practice of our invention for the production of fondants, the chip sugar is heated in any suitable container, for example, a steam-jacketed kettle, with preferably constant agitation to a temperature not in excess of 165 degrees F., preferably not in excess of about 145 degrees C., and particularly between about 125-135 degrees F., until the resulting mass is semi-liquid and free or substantially free from hard lumps. It is advisable that this operation be conducted so as not to dissolve too many of the fine crystals. Cane or beet sugar syrup or corn syrup or mixtures of these are then mixed with the melted chip sugar to give added sweetness or more body to the mass. After thorough mixing, the entire mass is cooled down, preferably to a temperature within the range of about 90-110 degrees F., creamed by suitable agitation, and the resulting fondant is then drawn off.

The following examples are illustrative of the production of fondants and fudges which may be made pursuant to our present invention. It will be understood that these examples are illustrative and are not intended in any way to be limitative of the full scope of the invention. Thus, for example, other fondant-type confections may be made, the proportions of ingredients may be modified, one or more of certain of the ingredients may be omitted as, for example, the sucrose or the invert sugar, and various other supplemental ingredients may be incorporated for specific purposes in specific formulae without in any manner departing from the essential teachings and guiding principles of our invention.

*Example 1.—Fondant*

260 pounds of #70 chip sugar were melted, under continuous agitation, in a jacketed kettle, at a temperature of about 125 degrees F. until the sharpness of the crystals and the lumps disappeared, the product having a soft, creamy consistency. In a separate kettle, 160 pounds of sucrose, 40 pounds of corn syrup, and 60 pounds of water were heated, under stirring, at about 135 degrees F. until the sucrose was completely dissolved. The previously prepared creamy chip sugar product was then added to the sucrose-corn syrup solution and cooled, while stirring, to about 100 degrees F. The mass was then allowed to stand for several hours until crystallization was completed. The resulting fondant had excellent texture and keeping quality.

*Example 2.—Fudge*

43 pounds of #70 chip sugar were melted as described in Example 1. In a separate kettle, 5 pounds of water and 21.5 pounds of corn syrup were mixed and heated to about 135 degrees F. To the resulting corn syrup solution, 14.5 pounds of evaporated milk, 9 pounds of chocolate liquor and 0.1 pound of glyceryl monostearate were added, with stirring, and then 6.8 pounds of invert sugar were admixed therewith. To the resulting mixture, 5 pounds of Mazetta (whipped egg albumen) were added and then the previously prepared melted chip sugar was incorporated with said mass, under thorough stirring, and the mass was allowed to cool slightly whereupon the desired amount of flavoring material was added. The mass was permitted to cool further to about 110 degrees F. and was then poured on a cooling slab and allowed to stand for several hours. The final fudge had excellent texture and retained such texture over a long period of time.

While, as indicated above, the proportions of ingredients in the fondant and fondant-type confections are subject to variation, we prefer to utilize amounts of ingredients falling within the scope of the proportions set out below in the case of illustrative formulae for fondants and fudges:

*Example A.—Fondants*

| Ingredients: | Parts by weight |
|---|---|
| #70 chip sugar | 35–55 |
| Invert sugar | 5–15 |
| Corn sugar | 15–35 |
| Water | 3–5 |
| Flavor | As desired |

*Example B.—Fondants*

| Ingredients: | Parts by weight |
|---|---|
| #70 chip sugar | 35–55 |
| Sucrose | 15–35 |
| Corn syrup | 5–20 |
| Water | 10–15 |
| Flavor | As desired |

*Example C.—Fudges*

| Ingredients: | Parts by weight |
|---|---|
| #70 chip sugar | 35–45 |
| Evaporated milk | 12–18 |
| Invert sugar | 5–10 |
| Mazetta or marshmallow creme | 4–8 |
| Chocolate liquor | 7–12 |
| Corn syrup | 15–35 |
| Water | 4–6 |
| Glyceryl monostearate | .1–.25 |
| Salt | 0.1 |
| Flavor | As desired |

It will be understood, of course, that, in the formulae shown in Examples A, B and C, various supplemental ingredients may be incorporated without in any way departing from the spirit or teachings of our invention.

While the invention has been described in detail, it will be understood that the scope thereof is not to be limited except as set forth in the claims.

What we claim as new and desire to protect by Letters Patent of the United States is:

1. A method of making fondant which comprises heating chip sugar at a temperature not in excess of 165 degrees F. to produce a semi-liquid mass of smooth, creamy consistency, admixing therewith a separately prepared aqueous solution of at least one sugar product from the group consisting of sucrose, corn sugar and corn syrup, and cooling and creaming said mixture.

2. A method of making fondant which comprises agitating and heating chip sugar at a temperature not in excess of 165 degrees F. until the resulting mass is semi-liquid and relatively free of hard lumps, admixing a sucrose syrup therewith, cooling said mass and creaming the same.

3. A method of making fondant which comprises agitating and heating #70 chip sugar at a temperature of about 125 to about 135 degrees F. until the resulting mass is semi-liquid and relatively free of hard lumps, admixing a sucrose syrup therewith, cooling said mass to a temperature of about 90 to about 110 degrees F., and creaming the same.

4. A method of making fondant which comprises agitating and heating #70 chip sugar at a temperature of about 125 to about 135 degrees F. until the resulting mass is semi-liquid and relatively free of hard lumps, admixing the same with a separately prepared aqueous solution containing at least one sugar product selected from the group consisting of sucrose, corn sugar and corn syrup, cooling said mass to a temperature of about 90 to about 110 degrees F., and creaming the same.

5. A method of making fondant which comprises agitating and heating chip sugar at a temperature not in excess of 165 degrees F. until the resulting mass is semi-liquid and relatively free of hard lumps, admixing the same with a separately prepared aqueous solution containing at least one sugar product selected from the group consisting of sucrose, corn sugar and corn syrup, cooling said mass and creaming the same, the chip sugar being present in amounts not less than the amount of any other of said single sugar products.

6. A method of making fondant which comprises heating chip sugar with a minor proportion of water, at a temperature of about 125 to about 135 degrees F. to produce a semi-liquid mass of smooth, creamy consistency, admixing therewith a separately prepared aqueous solution containing at least one sugar product selected from the group consisting of sucrose, corn sugar and corn syrup, cooling the mixture to within the range of about 90-110 degrees F. and creaming the same.

7. In a method of making fondant-type fudge, the steps which comprise agitating and heating #70 chip sugar at a temperature not in excess of 165 degrees F. until the resulting mass is semi-liquid and relatively free of hard lumps, admixing therewith a separately prepared syrup mixture containing at least the major remaining ingredients comprising the fudge formula, stirring while allowing the mixture to cool to a temperature of about 90-110 degrees F., and then allowing the mass to cool.

8. In a method of making fondant-type fudge, the steps which comprise agitating and heating chip sugar at a temperature not in excess of 165 degrees F. until the resulting mass is semi-liquid and relatively free of hard lumps, admixing therewith a separately prepared sugar syrup mixture containing at least the major remaining ingredients comprising the fudge formula, the chip sugar being present in amounts in excess of the amounts of any other single sugar product present, stirring while allowing the mixture to cool to a temperature of about 90-110 degrees F., and then allowing the mass to cool.

9. In a method of making fondant, the steps which comprise agitating and heating chip sugar at a temperature not in excess of 165 degrees F. until the resulting mass is semi-liquid and relatively free of hard lumps, admixing therewith a separately prepared sugar syrup mixture, stirring while allowing the mixture to cool to a temperature of about 90-110 degrees F., and then allowing the mass to cool, said fondant containing the following ingredients in the following parts by weight:

| | |
|---|---|
| Chip sugar | 35-55 |
| Invert sugar | 5-15 |
| Corn sugar | 15-35 |
| Water | 3-5 |

10. In a method of making fondant, the steps which comprise agitating and heating chip sugar at a temperature not in excess of 165 degrees F. until the resulting mass is semi-liquid and relatively free of hard lumps, admixing therewith a separately prepared sugar syrup mixture, stirring while allowing the mixture to cool to a temperature of about 90-110 degrees F., and then allowing the mass to cool, said fondant containing the following ingredients in the following parts by weight:

| | |
|---|---|
| Chip sugar | 35-55 |
| Sucrose | 15-35 |
| Corn syrup | 5-20 |
| Water | 10-15 |

HERMAN LEBESON.
ARCHER H. FIELD.

REFERENCES CITED

The following references are of record in the file of this patent:

UNITED STATES PATENTS

| Number | Name | Date |
|---|---|---|
| 1,939,990 | Krno et al. | Dec. 19, 1933 |
| 2,129,859 | Miner | Sept. 13, 1938 |
| 2,199,887 | Lund | May 7, 1940 |